March 21, 1933.   L. E. LA BRIE   1,902,647
BRAKE
Filed Jan. 30, 1929
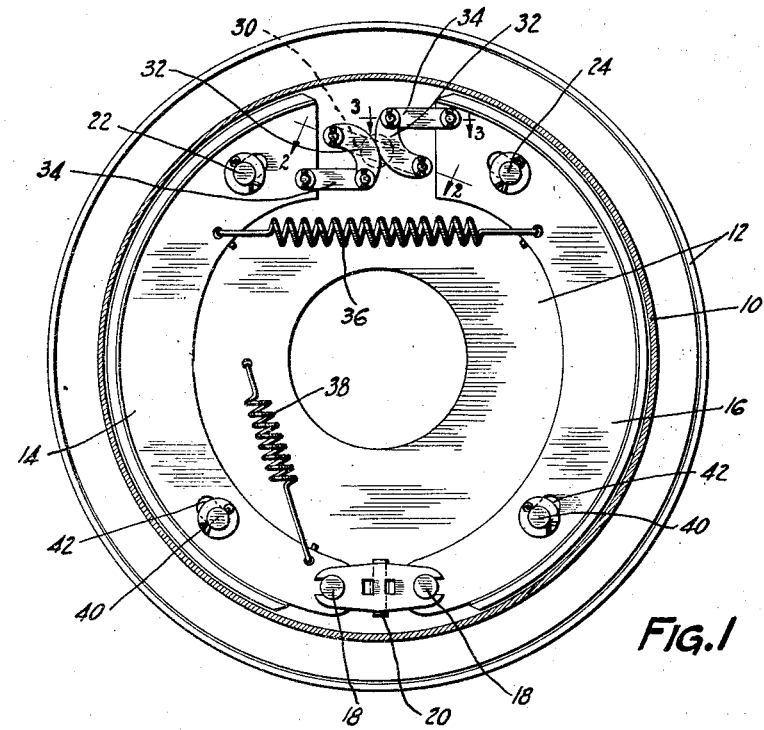
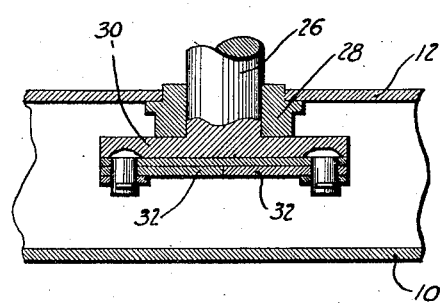
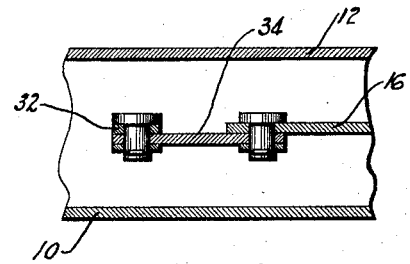
INVENTOR.
LUDGER E. LA BRIE
BY
ATTORNEY Patented Mar. 21, 1933

1,902,647

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed January 30, 1929. Serial No. 336,130.

This invention relates to brakes, and is illustrated as embodied in an internal expanding brake for an automobile. An object of the invention is to provide a simple applying device arranged to balance the thrusts on brake shoes or their equivalent, preferably by being connected to the ends of the shoes by links or the like. The applying device may include cams or thrust members connected to the links and pivoted on the end of an operating shaft in thrust engagement with each other.

Other objects and features of the invention, including novel positioning means determining the released positions of the shoes or their equivalents, will be apparent from the following description of one illustrative embodiment shown in the accompanying drawing, in which:

Figure 1 is a vertical section through the brake, just inside the head of the brake drum and showing the brake shoes in side elevation;

Figure 2 is a partial section on the line 2—2 of Figure 1, showing the mounting of the thrust members on the shaft; and Figure 3 is a partial section through one of the above-described links, on the line 3—3 of Figure 1.

The brake selected for illustration includes a rotatable drum 10, at the open side of which is a support such as the backing plate 12, and within which is the friction means of a floating brake. The friction means preferably includes a pair of interchangeable shoes 14 and 16 having transverse pivots 18 into which are threaded the right-and-left threaded ends of an adjusting member 20. When the drum is turning clockwise, shoe 14 anchors on a fixed post 22 carried by the backing plate, and when the drum is turning counterclockwise the shoe 16 anchors on a similar fixed post 24. The posts 22 and 24 pass through elongated slots in the webs of the shoes.

According to an important phase of the invention, the brake is applied by novel means including a shaft 26 positioned between the upper ends of the shoes. As shown, the shaft is journaled in a bracket 28 carried by the backing plate 12. Shaft 26 has a transverse crosshead 30, shown slightly inclined to the horizontal. This crosshead provides oppositely-extending arms to the free ends of which are pivoted at one end two thrust devices 32 having curved portions arranged in direct equalizing or balancing thrust engagement. The other ends of the equalizing or balancing thrust members 32 are pivotally connected to links 34 and the links are pivotally connected to the ends of the shoes 14 and 16. The above-described applying device may act against the resistance of a return spring 36.

The released positions of the shoes 14 and 16, or their equivalents, is determined by a spring 38 urging the shoe assembly upwardly to positions determined by the engagement of posts or stops 40 with the ends of elongated slots 42 in the shoe webs. Slots 42 do not restrain downward movement of the shoe assembly, and do not interfere with applying the brake.

While one illustrative embodiment has been described in detail, it is not my intention to limit the scope of the invention to that particular embodiment, or otherwise than by the terms of the appended claim.

I claim:

A brake having an operating shaft, a crosshead on the shaft, thrust members pivoted to opposite ends of the crosshead on opposite sides of the axis of the shaft and rolling against each other, approximately at said axis and thrust links pivoted to the ends of said thrust members and constructed and arranged for operative engagement with the friction means of a brake.

In testimony whereof, I have hereunto signed my name.

LUDGER E. LA BRIE.